United States Patent
Aota et al.

(10) Patent No.: US 8,059,241 B2
(45) Date of Patent: Nov. 15, 2011

(54) LIQUID CRYSTAL DISPLAY AND METHOD OF MANUFACTURING THE SAME

(75) Inventors: Masaaki Aota, Suwa (JP); Manabu Watanabe, Chino (JP); Tatsuya Yata, Ogaki (JP); Yasuo Segawa, Ibaraki (JP); Tomohide Onogi, Chino (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/397,725

(22) Filed: Mar. 4, 2009

(65) Prior Publication Data

US 2009/0231529 A1   Sep. 17, 2009

(30) Foreign Application Priority Data

Mar. 13, 2008  (JP) .................................. 2008-063710
Mar. 13, 2008  (JP) .................................. 2008-063711
Mar. 19, 2008  (JP) .................................. 2008-070792

(51) Int. Cl.
*G02F 1/1337* (2006.01)

(52) U.S. Cl. ............ 349/123; 349/56; 349/84; 349/122; 349/124; 349/128

(58) Field of Classification Search .................... 349/56, 349/84, 122, 123, 124, 128
See application file for complete search history.

(56) References Cited

U.S. PATENT DOCUMENTS

| | | | |
|---|---|---|---|
| 5,953,084 A | 9/1999 | Shimada et al. | |
| 6,052,162 A | 4/2000 | Shimada et al. | |
| 6,097,452 A | 8/2000 | Shimada et al. | |
| 6,195,138 B1 | 2/2001 | Shimada et al. | |
| 6,317,183 B2 * | 11/2001 | Komatsu | ......... 349/141 |
| 6,362,032 B1 | 3/2002 | Kim et al. | |
| 6,433,851 B2 | 8/2002 | Shimada et al. | |
| 6,590,627 B2 | 7/2003 | Tomioka et al. | |

FOREIGN PATENT DOCUMENTS

| | | |
|---|---|---|
| CN | 1470907 A | 1/2004 |
| CN | 1904707 A | 1/2007 |
| JP | A-11-305266 | 11/1999 |
| JP | A-2002-23184 | 1/2002 |
| JP | A-2002-296611 | 10/2002 |
| KR | A-2002-0057240 | 7/2002 |
| KR | A-2002-0070756 | 9/2002 |

* cited by examiner

*Primary Examiner* — Jennifer Doan
(74) *Attorney, Agent, or Firm* — K&L Gates LLP

(57) ABSTRACT

A liquid crystal display includes a liquid crystal disposed between a first transparent substrate and a second transparent substrate, a first electrode and second electrode which overlie the first transparent substrate and which are used to drive the liquid crystal, one or more layers overlying the first electrode, and one or more layers overlying the second electrode. The correlation between layers disposed between the first electrode and the liquid crystal agrees with the correlation between layers disposed between the second electrode and the liquid crystal.

8 Claims, 11 Drawing Sheets

LIQUID CRYSTAL DISPLAY AND METHOD OF MANUFACTURING THE SAME

BACKGROUND

1. Technical Field

The present invention relates to liquid crystal displays and methods of manufacturing the liquid crystal displays. The present invention particularly relates to a liquid crystal display containing a liquid crystal controlled by an electric field substantially parallel to a transparent substrate and also relates to a method of manufacturing the liquid crystal display.

2. Related Art

Liquid crystal displays operating in a fringe-field switching (FFS) mode, an in-plane switching (IPS) mode, or another mode are known to have high contrast and wide viewing angles. The liquid crystal displays use electric fields substantially parallel to transparent substrates.

For example, an FFS-mode liquid crystal display includes two transparent substrates and a liquid crystal sandwiched therebetween. One of the transparent substrates has pixel electrodes supplied with display signals. A common electrode is disposed above the pixel electrodes with an insulating layer disposed therebetween. The common electrode includes a plurality of linear portions and slit portions alternately arranged and is applied with a common potential.

FIG. 17 illustrates an example of the arrangement of the pixel electrodes and the common electrode in cross section. With reference to FIG. 17, a planarization layer 18, which extends over a first transparent substrate (not shown) having pixel transistors, underlies pixel electrodes 20 made of a transparent conductive material such as indium tin oxide (ITO) or indium zinc oxide (IZO). The pixel electrodes 20 are covered with an insulating layer 21 made of an inorganic material such as silicon nitride. The insulating layer 21 underlies a common electrode which is made of a transparent conductive material such as ITO or IZO, which includes a plurality of linear portions 22E and slit portions 22S alternately arranged, and which is supplied with a common potential. The linear portions 22E and the slit portions 22S are covered with a first alignment layer 24 made of a polyimide-based resin. The first transparent substrate is attached to a second transparent substrate (not shown) having a second alignment layer. A liquid crystal LC is sealed between the first and second transparent substrates. The first transparent substrate and the second transparent substrate have a first polarizer (not shown) and a second polarizer (not shown), respectively. The transmission axis of the first polarizer is perpendicular to that of the second polarizer. The rubbing direction of the first alignment layer 24 and that of a second alignment layer are parallel to the transmission axis of, for example, the first polarizer and are planarly inclined at about five to ten degrees to the longitudinal direction of the linear portions 22E.

The FFS-mode liquid crystal display is disclosed in JP-A-2002-296611.

The FFS-mode liquid crystal display, which has higher contrast and wider viewing angles as compared to other liquid crystal displays such as TN-mode liquid crystal displays, has a problem in that the center of an optimum common potential shifts from an initial value during continuous operation and therefore image sticking is caused. This leads to the deterioration of the display quality of the FFS-mode liquid crystal display.

The evaluation of the FFS-mode liquid crystal display by experiments has shown that the shift of the center of the common potential and image sticking significantly depend on properties of the first alignment layer 24.

Suppose attention is focused on members disposed near the first alignment layer 24 shown in FIG. 17. The following interfaces are present on or above the linear portions 22E: the interfaces H between the first alignment layer 24 and the linear portions 22E and the interface I between the first alignment layer 24 and the liquid crystal LC. On the other hand, the following interfaces are present under the slit portions 22S: the interfaces J between the insulating layer 21 and the pixel electrodes 20, the interface K between the insulating layer 21 and the first alignment layer 24, and the interface L between the first alignment layer 24 and the liquid crystal LC. That is, the correlation between layered members disposed on or above the linear portions 22E disagrees with the correlation between layered members disposed under the slit portions 22S.

When electric fields are generated between the pixel electrodes 20 and the linear portions 22E by the difference between the potential of each display signal and the common potential, the amount of charge accumulated at the interfaces H and I on or above the linear portions 22E differs from that at the interfaces J, K, and L under the slit portions 22S. The difference between the charge amounts causes unnecessary direct current components between the pixel electrodes 20 and the linear portions 22E. This probably causes the shift of the center of the optimum common potential and image sticking.

In order to cope with this problem, another material may be used to form the first alignment layer 24 or another liquid crystal may be used instead of the liquid crystal LC. However, this causes trade-off problems such as a reduction in orientation force and image sticking due to excessive charge transfer. Therefore, sufficient improvements have not been achieved yet.

SUMMARY

An advantage of a first aspect of the invention provides a liquid crystal display including a liquid crystal disposed between a first transparent substrate and a second transparent substrate, a first electrode and second electrode which overlie the first transparent substrate and which are used to drive the liquid crystal, one or more layers overlying the first electrode, and one or more layers overlying the second electrode. The correlation between layers disposed between the first electrode and the liquid crystal agrees with the correlation between layers disposed between the second electrode and the liquid crystal.

An advantage of a second aspect of the invention provides a liquid crystal display including a liquid crystal disposed between a first transparent substrate and a second transparent substrate, a first electrode and second electrode which overlie the first transparent substrate and which are used to drive the liquid crystal, one or more layers overlying the first electrode, and one or more layers overlying the second electrode. The amount of charge accumulated at the interface or interfaces between layers disposed between the first electrode and the liquid crystal is substantially equal to the amount of charge accumulated at the interface or interfaces between layers disposed between the second electrode and the liquid crystal.

The liquid crystal display according to the first or second aspect further includes a first inorganic layer extending over the first electrode, a second inorganic layer overlying the second electrode, and an alignment layer extending over the second inorganic layer. The second electrode includes linear portions and slit portions alternately arranged on or above the first inorganic layer.

In the liquid crystal display according to the first or second aspect, portions of the second inorganic layer are disposed only on the linear portions and the alignment layer extends over the first inorganic layer, the second electrode, and the second inorganic layer.

In the liquid crystal display according to the first or second aspect, the second inorganic layer extends over the first inorganic layer, the linear portions, and the slit portions.

In the liquid crystal display according to the first or second aspect, the first and second inorganic layers are made of the same material.

In the liquid crystal display according to the first or second aspect, the first and second inorganic layers contain a nitrogen compound.

In the liquid crystal display according to the first or second aspect, the first and second inorganic layers contain an oxygen compound.

The liquid crystal display according to the first or second aspect further includes an organic layer which is made of an organic material having an imide bond and which extends over the first electrode and also includes an alignment layer made of an organic material having an imide bond. The second electrode includes linear portions and slit portions alternately arranged on or above the inorganic layer. The alignment layer extends over the organic layer, the linear portions, and the slit portions.

The liquid crystal display according to the first or second aspect further includes an organic layer which is made of an organic material such as polyamide and which extends over the first electrode and also includes an alignment layer made of an organic material such as polyamide. The second electrode includes linear portions and slit portions alternately arranged on or above the inorganic layer. The alignment layer extends over the organic layer, the linear portions, and the slit portions.

In the liquid crystal display according to the first or second aspect, the organic layer and the alignment layer are made of the same material.

In the liquid crystal display according to the first or second aspect, the first and second electrodes are transparent.

An advantage of a third aspect of the invention provides a method of manufacturing the liquid crystal display according to the first or second aspect. The method includes forming the first electrode on or above the first transparent substrate, forming the first inorganic layer over the first electrode, forming a transparent conductive material layer over the first inorganic layer, forming the second inorganic layer over the transparent conductive material layer, forming the second electrode in such a manner that the transparent conductive material layer and the second inorganic layer are patterned together such that the linear portions and the slit portions have portions of the transparent conductive material layer and portions of the second inorganic layer and are alternately arranged, forming the alignment layer over the second electrode, and attaching the second transparent substrate to the first transparent substrate to seal the liquid crystal between the first transparent substrate and the second transparent substrate.

The method according to the third aspect further includes forming an interconnect layer extending to a region which is disposed on the first transparent substrate and which is used to form a terminal section and also includes forming an electrode over the interconnect layer. The first inorganic layer is formed such that the first electrode is covered with the first inorganic layer and the electrode is exposed from the first inorganic layer. The transparent conductive material layer is formed so as to cover the first inorganic layer and the exposed electrode. The transparent conductive material layer and the second inorganic layer are patterned together such that the second electrode remains and the second inorganic layer is partly removed from the electrode.

An advantage of a fourth aspect of the invention provides a method of manufacturing the liquid crystal display according to the first or second aspect. This method includes forming the first electrode on or above the first transparent substrate; forming the first inorganic layer over the first electrode; forming the second electrode on the first inorganic layer; forming the second inorganic layer over the first inorganic layer, the linear portions, and the slit portions; forming the alignment layer over the second inorganic layer; and attaching the second transparent substrate to the first transparent substrate to seal the liquid crystal between the first transparent substrate and the second transparent substrate.

In the method according to the third or fourth aspect, the second inorganic layer is formed by a chemical vapor deposition process.

In the method according to the third or fourth aspect, the second inorganic layer is formed by a coating process.

In the method according to the third or fourth aspect, the second inorganic layer is formed by printing an inorganic material.

In the method according to the third or fourth aspect, the first and second inorganic layers are made of the same material.

An advantage of a fifth aspect of the invention provides a method of manufacturing the liquid crystal display according to the first or second aspect. This method includes forming the first electrode on or above the first transparent substrate; forming the inorganic layer over the first electrode; forming the second electrode on the first inorganic layer; forming the alignment layer over the inorganic layer, the linear portions, and the slit portions; rubbing the alignment layer; and attaching the second transparent substrate to the first transparent substrate to seal the liquid crystal between the first transparent substrate and the second transparent substrate.

An advantage of a sixth aspect of the invention provides a method of manufacturing the liquid crystal display according to the first or second aspect. This method includes forming the first electrode on or above the first transparent substrate; forming the inorganic layer over the first electrode; forming the second electrode on the first inorganic layer; forming the alignment layer over the inorganic layer, the linear portions, and the slit portions; rubbing the alignment layer; and attaching the second transparent substrate to the first transparent substrate to seal the liquid crystal between the first transparent substrate and the second transparent substrate.

In the method according to the fifth or sixth aspect, the inorganic layer and the alignment layer are made of the same material.

In the method according to the fifth or sixth aspect, the alignment layer is formed by printing an organic material.

In the method according to the fifth or sixth aspect, the first and second electrodes are transparent.

According to the present invention, in an FFS-mode liquid crystal display and a method of manufacturing the display, the shift of the center of a common potential and image sticking are prevented, whereby display quality can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
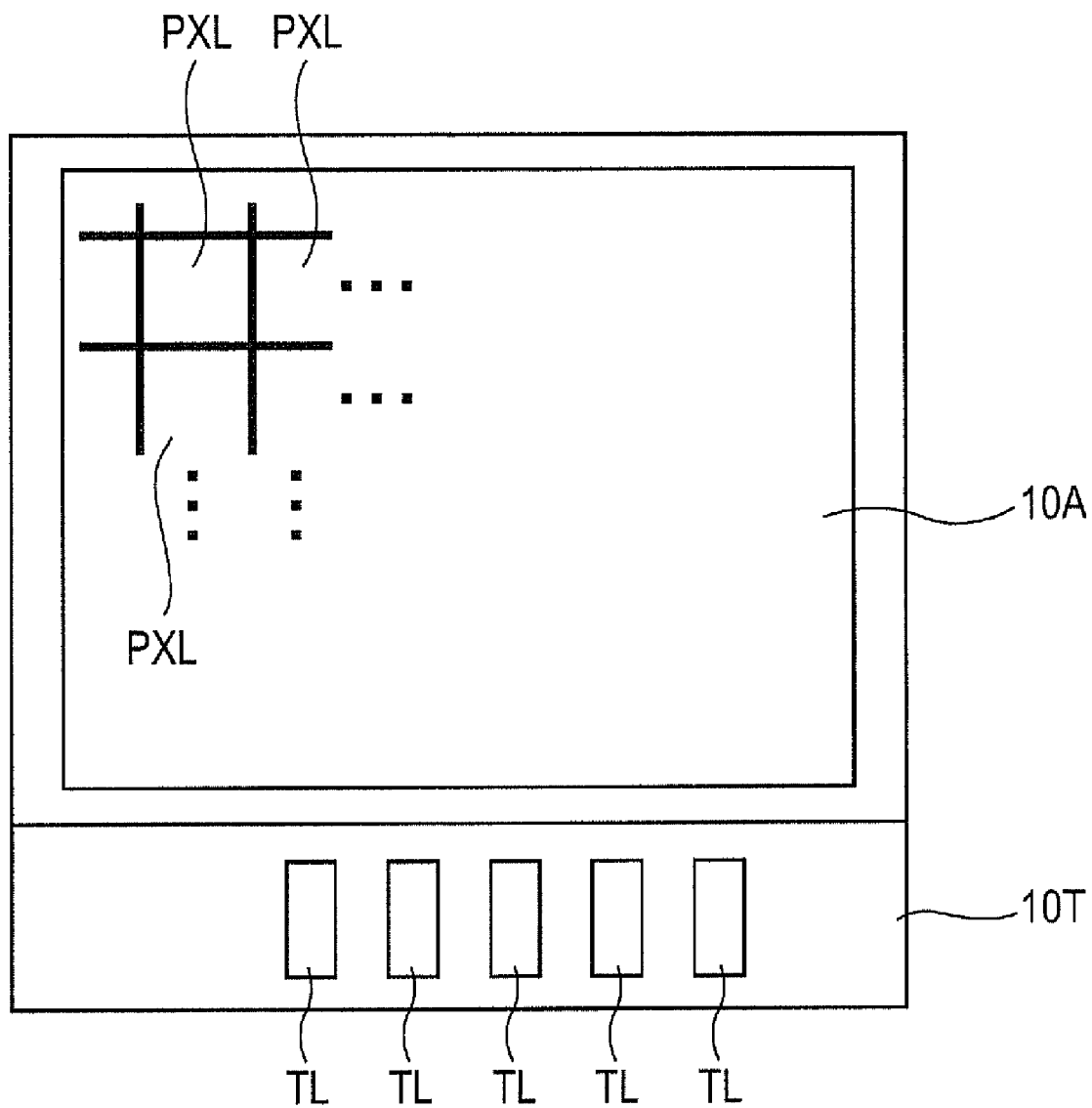
FIG. 1 is a schematic plan view of a liquid crystal display according to a first embodiment of the present invention.
Figure 2:
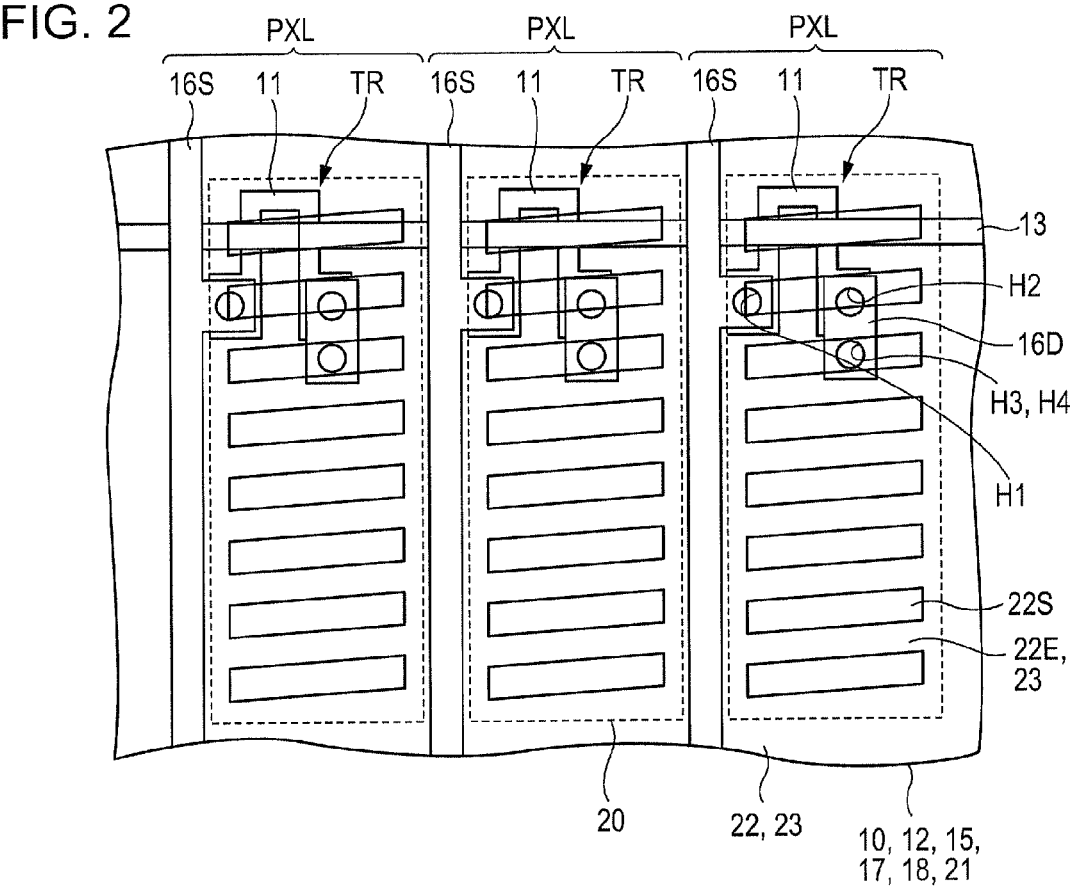
FIG. 2 is an enlarged plan view of pixels arranged in a display section included in the liquid crystal display shown in FIG. 1.
Figure 3:
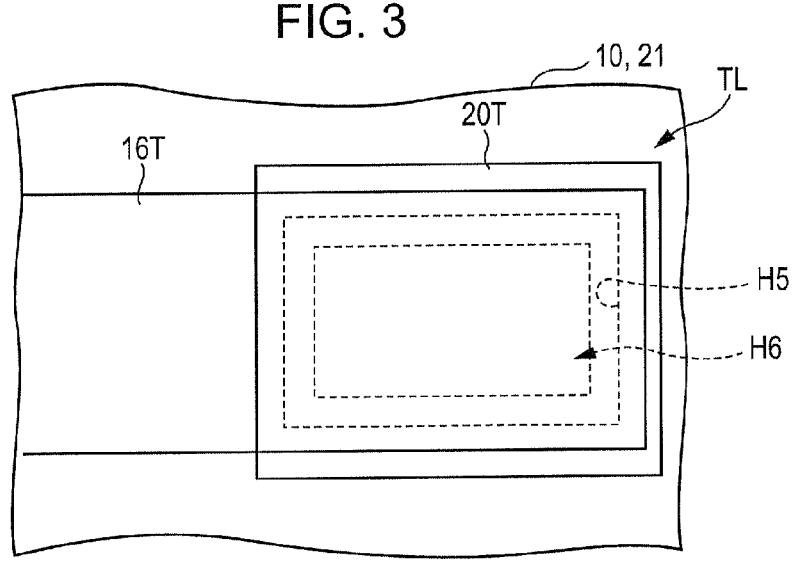
FIG. 3 is an enlarged plan view of one of terminals arranged in a terminal section included in the liquid crystal display shown in FIG. 1.

A liquid crystal display according to a first embodiment of the present invention will now be described with reference to drawings below. FIG. 1 is a schematic plan view of the liquid crystal display. FIG. 2 is an enlarged plan view of three of pixels PXL arranged in a display section 10A, shown in FIG. 1, operating in an FFS mode. FIG. 3 is an enlarged plan view of one of terminals TL arranged in a terminal section 10T shown in FIG. 1. FIGS. 1 to 3 show only principal members of the liquid crystal display for brief description.

In descriptions below, in order to complement the arrangement of first to fifth contact holes H1 to H5 and openings H6, a gate insulating layer 12, an interlayer insulating layer 15, a passivation layer 17, and a planarization layer 18 are referred to. The correlation between these layers is shown in the description below of a method of manufacturing the liquid crystal display.

With reference to FIG. 1, the liquid crystal display includes the display section 10A and the terminal section 10T, the display section 10A includes the pixels PXL, and the terminal section 10T includes the terminals TL. With reference to FIG. 2, gate lines 13 supplied with gate signals, that is, pixel selection signals intersect source lines 16S supplied with source signals, that is, display signals and the pixels PXL are arranged in the display section 10A so as to correspond to intersections of the gate lines 13 and the source lines 16S.

The pixels PXL include pixel transistors TR, such as thin-film transistors, arranged on a first transparent substrate 10. The gates of the pixel transistors TR are connected to gate electrodes that are portions of the gate lines 13, the sources thereof are connected to the source lines 16S through the first contact holes H1, and the drains thereof are connected to drain electrodes 16D through the second contact holes H2. The first and second contact holes H1 and H2 extend through the gate insulating layer 12 and the interlayer insulating layer 15. The drain electrodes 16D are connected to the pixel electrodes 20 through the third and fifth contact holes H3 and H5. The third contact holes H3 extend through the passivation layer 17 and the fifth contact holes H5 extend through the planarization layer 18.

The pixel electrodes 20 are covered with an insulating layer 21. The insulating layer 21 underlies a common electrode 22. The common electrode 22 includes a plurality of linear portions 22E and slit portions 22S. The linear portions 22E and slit portions 22S are alternately arranged and extend in parallel to each other. The common electrode 22 is connected to a common electrode line (not shown) with a contact hole (not shown). The common electrode line extends near an end portion of the display section 10A and is supplied with a common potential.

The pixel electrodes 20, the insulating layer 21, and the linear portions 22E are arranged in that order and form storage capacitors which store the source signals for a predetermined time. The drains of the pixel transistors TR may be connected to other storage capacitors (not shown) which store the source signals for a predetermined time and which supply the source signals to the pixel electrodes 20.

With reference to FIG. 3, an interconnect layer 16T extend above the first transparent substrate 10 from the pixels PXL and the like, which are arranged in the display section 10A, to the terminals TL, which are arranged in the terminal section 10T. The interconnect layer 16T is connected to, for example, the source lines 16S, which extend in the display section 10A. The interconnect layer 16T is also connected to electrodes 20T disposed above the interconnect layer 16T through the fourth contact holes H4. The fourth contact holes H4 extend through the passivation layer 17. The electrodes 20T are covered with the insulating layer 21. The insulating layer 21 has the openings H6. The electrodes 20T are also connected to external terminals (not shown), such as chips-on-glass (COG) or flexible printed circuits (FPCs), extending from external driving circuits (not shown), through the openings H6.

In the pixels PXL, the pixel transistors TR are turned on in response to pixel selection signals supplied from the gate lines 13, whereby display signals are supplied to the pixel electrodes 20 through the source lines 16S and the pixel transistors TR. This generates electric fields substantially parallel to the first transparent substrate 10 between the pixel electrodes 20 and the linear portions 22E in response to the display signals. The orientation of molecules of a liquid crystal (not shown) is changed depending on the electric fields, whereby optical control for display is performed. On the other hand, driving signals such as pixel selection signals or display signals are supplied to the terminals TL from driving circuits (not shown) through FPCs or the like.

Second Embodiment

A second embodiment of the present invention provides a method of manufacturing liquid crystal displays that are the same as the liquid crystal display according to the first embodiment. The method will now be described with reference to drawings below. FIGS. 4A to 7A show one of pixels PXL arranged in a display section 10A included in each liquid crystal display in cross section. FIGS. 4B to 7B show one of terminals TL arranged in a terminal section 10T included in the liquid crystal display in cross section. In FIGS. 4A to 7A and 4B to 7B, the same members as those shown in FIGS. 1 to 3 and 17 are denoted by the same reference numerals as those used in FIGS. 1 to 3 and 17.

Figure 4A:
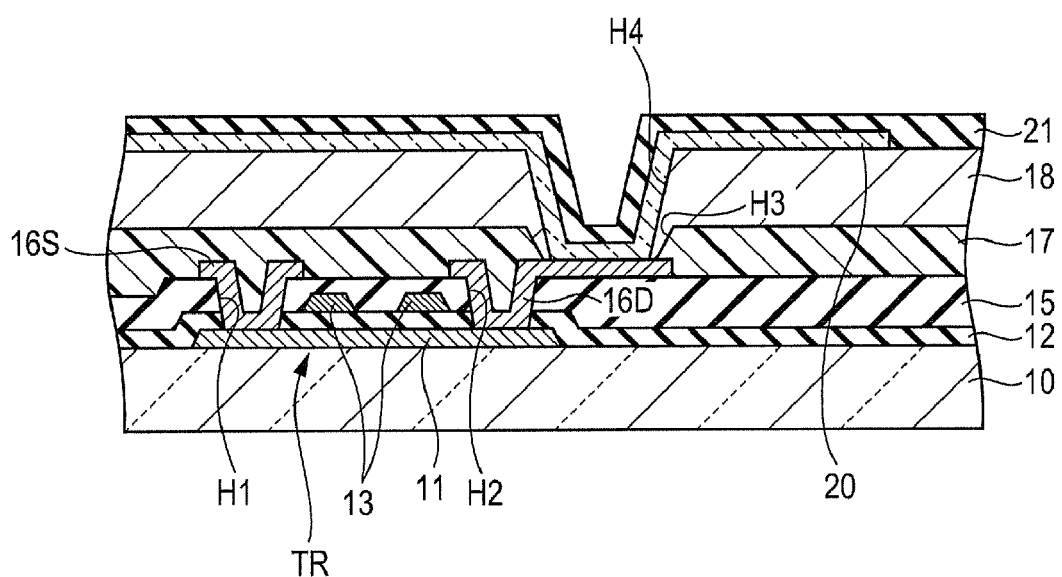
FIGS. 4A and 4B are sectional views illustrating a method of manufacturing the liquid crystal display according to the first embodiment.
Figure 4B:
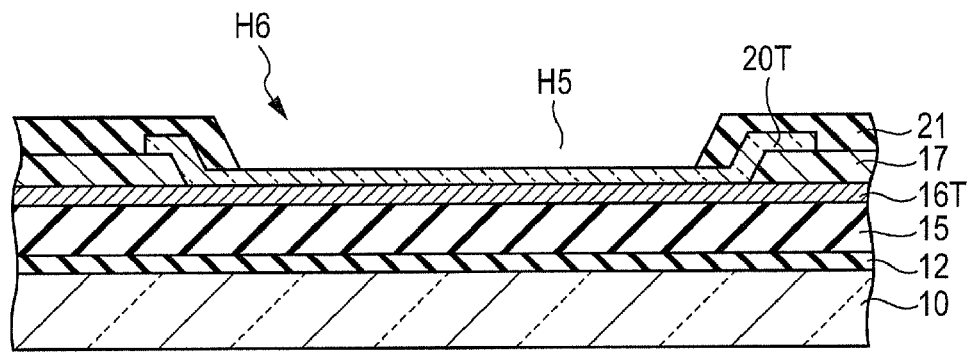

As shown in FIGS. 4A and 4B, active layers 11 are formed in a region of the display section 10A, the region being disposed on a first transparent substrate 10 and being used to form the pixels PXL and pixel transistors TR. A gate insulating layer 12 is formed on the first transparent substrate 10 so as to extend over the active layers 11 to the terminal section 10T. Gate lines 13 are formed on the gate insulating layer 12 so as to overlap the active layers 11. A common electrode line, which is not shown, supplied with a common potential is also formed on a portion of the gate insulating layer 12 that is located near an end portion of the display section 10A.

An interlayer insulating layer 15 is formed on a portion of the gate insulating layer 12 so as to cover the gate lines 13 and the common electrode line, the portion ranging from the display section 10A to the terminal section 10T. Source lines 16S and drain electrodes 16D are formed on a portion of the interlayer insulating layer 15 that is disposed in the display section 10A, the source lines 16S being connected to sources of the active layers 11 through first contact holes H1, the drain electrodes 16D being connected to drains of the active layers 11 through second contact holes H2.

An interconnect layer 16T is formed in a portion of the terminal section 10T that is disposed on the interlayer insulating layer 15. The interconnect layer 16T extends from the display section 10A. The source lines 16S, the drain electrodes 16D, and the interconnect layer 16T are laminates formed together from a single layer including, for example, a titanium sub-layer, aluminum sub-layer, and titanium sub-layer arranged in that order. A passivation layer 17 is formed on the interlayer insulating layer 15 so as to cover the source lines 16S, the drain electrodes 16D, and the interconnect layer 16T. The passivation layer 17 is a silicon nitride film formed at, for example, 300° C. to 400° C.

The passivation layer 17 is masked with a resist layer (not shown) and is then dry-etched, whereby third contact holes H3 and fifth contact holes H5 are formed in the passivation layer 17. The drain electrodes 16D are exposed through the third contact holes H3. The interconnect layer 16T is exposed through the fifth contact holes H5.

After the resist layer is removed, a planarization layer 18 such as an organic layer is formed over the walls of the third and fifth contact holes H3 and H5 and the passivation layer 17. The planarization layer 18 is masked with another resist layer (not shown) and is then dry-etched, whereby fourth contact holes H4 are formed in the planarization layer 18. The fourth contact holes H4 are connected to the third contact holes H3 and therefore the drain electrodes 16D are exposed through the third and fourth contact holes H3 and H4. The planarization layer 18 is partly removed from the terminal section 10T, so that interconnect layer 16T is exposed through the fifth contact holes H5 again.

Pixel electrodes 20 are formed on the planarization layer 18 so as to extend through the fourth contact holes H4 to the drain electrodes 16D. The pixel electrodes 20 are an example of first electrodes specified in the claims. Electrodes 20T are formed in the terminal section 10T so as to be connected to the interconnect layer 16T through the fifth contact holes H5. The electrodes 20T are an example of electrodes specified in the claims. The pixel electrodes 20 and the electrodes 20T are formed from a transparent conductive material such as ITO or IZO by patterning. The pixel electrodes 20 and the electrodes 20T preferably have a thickness of about 100 nm.

An insulating layer 21 is formed over a portion of the planarization layer 18 that is disposed in the display section 10A and a portion of the passivation layer 17 that is disposed in the terminal section 10T, whereby the pixel electrodes 20 and the electrodes 20T are covered with the insulating layer 21. The insulating layer 21 is an inorganic film such as a silicon nitride film formed at a low temperature of about 200° C. The insulating layer 21 has portions which are disposed between linear portions 22E disposed in a common electrode 22 and which have a thickness of about 2 to 4 μm so as to form optimum capacitors. The insulating layer 21 is an example of a first inorganic layer specified in the claims.

A resist layer (not shown) having open portions corresponding to the electrodes 20T are formed on the insulating layer 21. The insulating layer 21 is dry-etched using this resist layer as a mask, whereby openings H6 are formed in the insulating layer 21. The openings H6 are connected to the fifth contact holes H5, which are disposed in the terminal section 10T, and therefore the electrodes 20T are exposed through the openings H6.

Figure 5A:
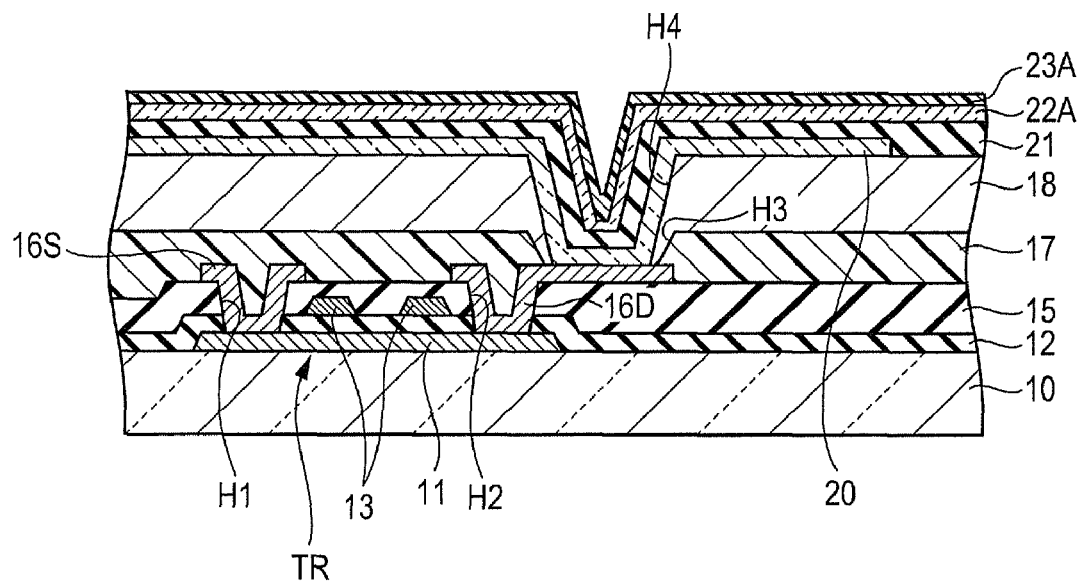
FIGS. 5A and 5B are sectional views illustrating the method of manufacturing the liquid crystal display according to the first embodiment.
Figure 5B:
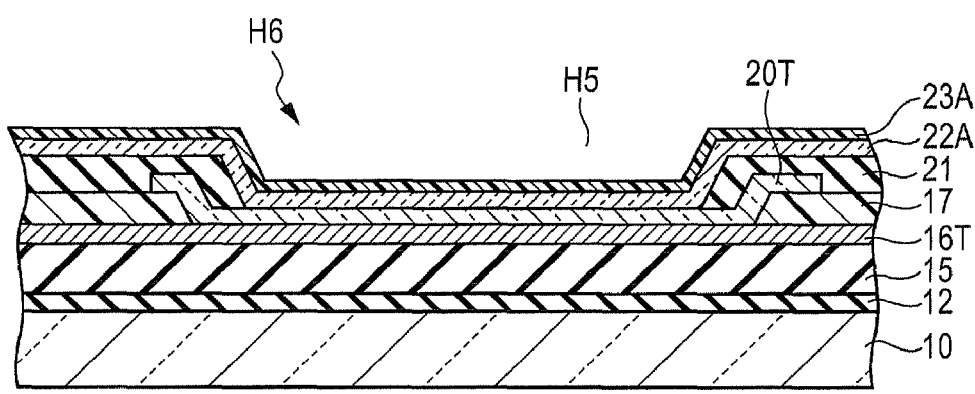

After this resist layer is removed, a transparent conductive material layer 22A made of ITO or IZO is formed over the insulating layer 21, which extends from the display section 10A to the terminal section 10T, as shown in FIGS. 5A and 5B.

An inorganic layer 23A made of silicon nitride or the like is formed over the transparent conductive material layer 22A, which extends from the display section 10A to the terminal section 10T, by a chemical vapor deposition (CVD) process or a coating process such as a spin coating process or a printing process. The thickness of the inorganic layer 23A is not particularly limited and is preferably small in consideration of that bumps cause difficulties in rubbing a first alignment layer 24. The inorganic layer 23A preferably has a thickness of, for example, 50 nm or less. The inorganic layer 23A and the insulating layer 21 may be made of an inorganic material other than silicon nitride and are preferably made of the same material.

Figure 6A:
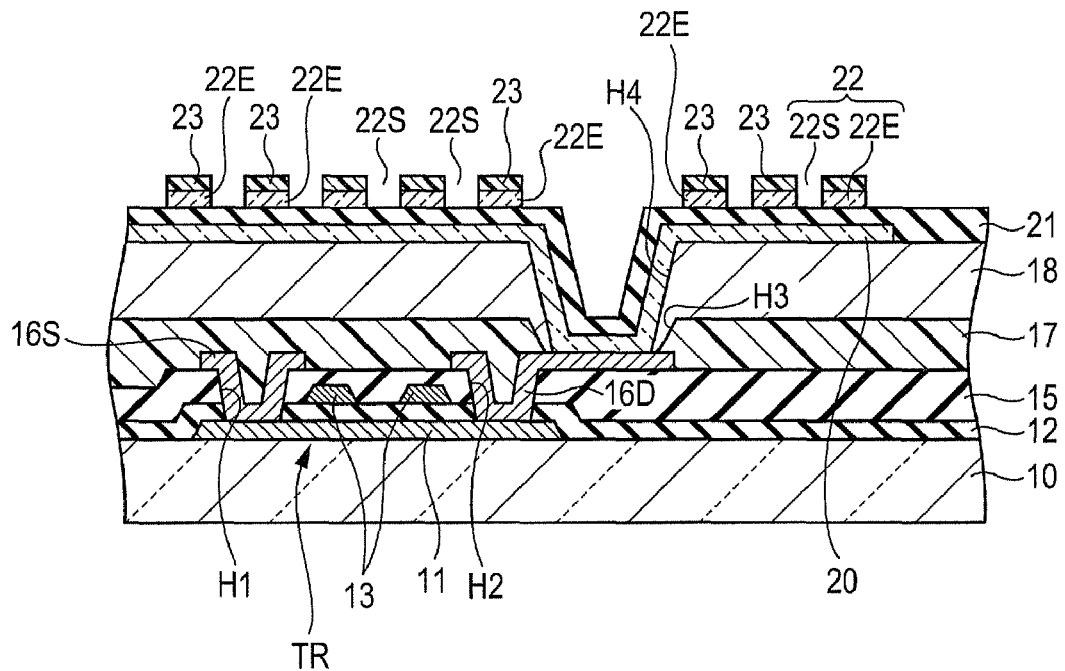
FIGS. 6A and 6B are sectional views illustrating the method of manufacturing the liquid crystal display according to the first embodiment.
Figure 6B:
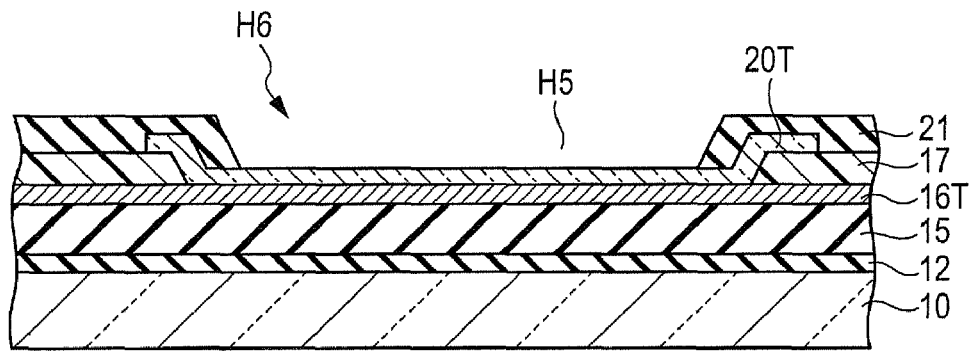

As shown in FIGS. 6A and 6B, the inorganic layer 23A and the insulating layer 21 are patterned by dry etching using resist layers (not shown) as masks. These resist layers cover only regions used to form the linear portions 22E.

This allows the common electrode 22 to be formed on the insulating layer 21 such that the linear portions 22E and slit portions 22S are alternately arranged and extend in parallel to each other and also allows inorganic layer portions 23 to be formed only on the linear portions 22E. None of the inorganic layer portions 23 is present in the terminal section 10T. As described above, the common electrode 22 and the inorganic layer portions 23 arranged thereon can be achieved by patterning in a single dry etching step. The inorganic layer 23A is an example of a second inorganic layer specified in the claims. The common electrode 22 is an example of a second electrode specified in the claims.

In this embodiment, the common electrode 22 and the inorganic layer portions 23 arranged thereon can be achieved by patterning in a single dry etching step as described above. Therefore, the method is simpler and less in manufacturing cost as compared to the case where the transparent conductive material layer 22A is formed, the common electrode 22 is formed by patterning the transparent conductive material layer 22A, the inorganic layer 23A is formed over the common electrode 22, and the inorganic layer portions 23 are then formed only on the linear portions 22E by patterning the inorganic layer 23A.

Figure 7A:
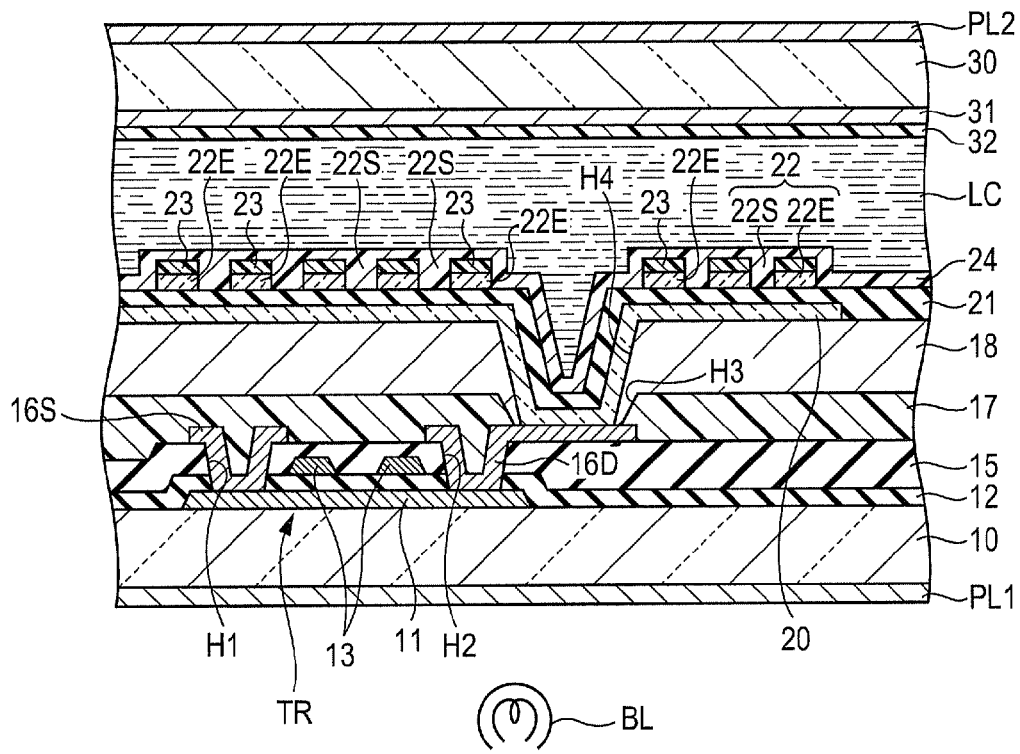
FIGS. 7A and 7B are sectional views illustrating the method of manufacturing the liquid crystal display according to the first embodiment.
Figure 7B:
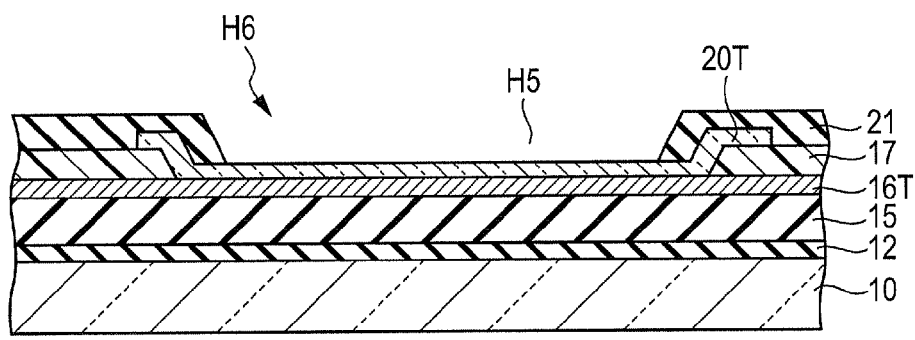

As shown in FIGS. 7A and 7B, the first alignment layer 24 is formed over the common electrode 22 and the inorganic layer portions 23. The first alignment layer 24 is made of a polyimide-based resin. The rubbing direction of the first alignment layer 24 is planarly inclined at about five to ten degrees to the longitudinal direction of the linear portions 22E. The first alignment layer 24 is an example of an alignment layer specified in the claims.

A second transparent substrate 30 is attached to the first transparent substrate 10. A liquid crystal LC, such as a nematic liquid crystal, having positive dielectric anisotropy is sealed between the first and second transparent substrates 10 and 30. The second transparent substrate 30 has a surface facing the first transparent substrate 10 and this surface carries a black matrix (not shown), a color filter 31, and a second alignment layer 32 extending thereover. The second alignment layer 32 is made of a polyimide-based resin. The rubbing direction of the second alignment layer 32 is parallel to that of the first alignment layer 24.

In a portion of the above procedure, a first polarizer PL1 is provided on a surface of the first transparent substrate 10 that faces a light source BL. The transmission axis of the first polarizer PL1 is parallel to the rubbing direction of the first alignment layer 24. In a portion of the procedure, a second polarizer PL2 is provided on a surface of the second transparent substrate 30 that oppositely faces the first transparent substrate 10. The transmission axis of the second polarizer PL2 is perpendicular to the rubbing direction of the first polarizer PL1.

A laminate including the first and second transparent substrates 10 and 30 and the above members is divided into the liquid crystal displays by scribing or breaking.

Suppose attention is focused on the correlation between layered members disposed between the liquid crystal LC and pixel electrodes 20 of the display section 10A of each liquid crystal display completed as described above. The correlation between layered members disposed on or above the linear portions 22E agrees with the correlation between layered members disposed under the slit portions 22S. This is the result achieved by the deposition of the inorganic layer portions 23 on the linear portions 22E.

Figure 8:
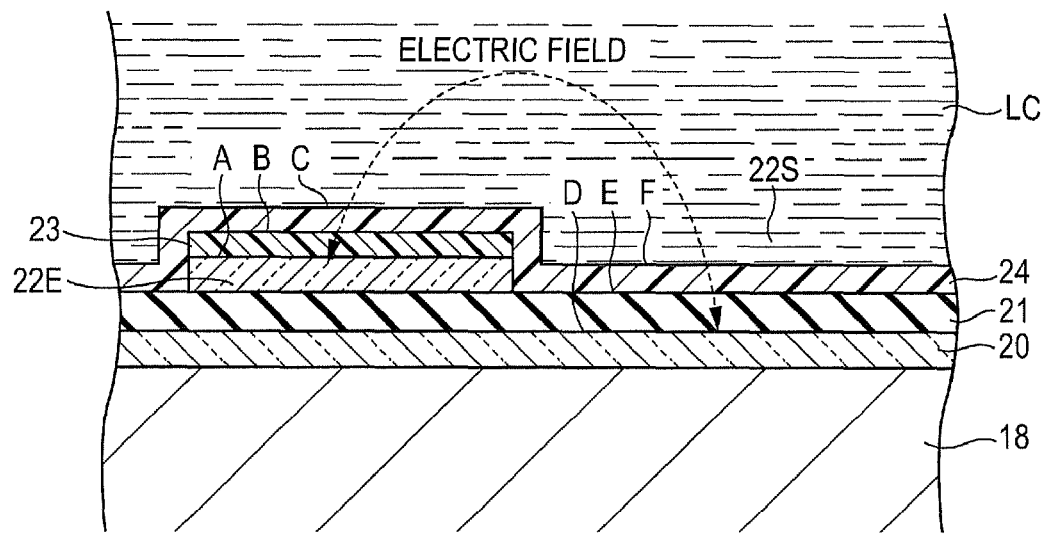
FIG. 8 is a sectional view of the liquid crystal display according to the first embodiment.

The agreement of these correlations will now be described with reference to a drawing below. FIG. 8 is a partly enlarged view showing members arranged near the first alignment layer 24 shown in FIG. 7. In each region containing a corresponding one of the linear portions 22E, the following interfaces are arranged on the linear portion 22E in this order as shown in FIG. 8: the interface A between the linear portion 22E, which is made of a transparent conductive material such as ITO, and a corresponding one of the inorganic layer portions 23, which are made of silicon nitride or the like; the interface B between the inorganic layer portion 23 and the first alignment layer 24, which is made of a polyimide-based resin; and the interface C between the first alignment layer 24 and the liquid crystal LC.

On the other hand, in each region containing a corresponding one of the slit portions 22S, the following interfaces are arranged in this order: the interface D between a corresponding one of the pixel electrodes 20, which are made of a transparent conductive material such as ITO, and the insulating layer 21, which is made of an inorganic material such as silicon nitride; the interface E between the insulating layer 21 and the first alignment layer 24, which is made of a polyimide-based resin; and the interface F between the insulating layer 21 and the liquid crystal LC. That is, the correlation between layered members disposed on or above the linear portion 22E agrees with the correlation between layered members disposed under the slit portion 22S.

This configuration allows the amount of charge accumulated at the interfaces A, B, and C present in the linear portion 22E-containing region to be substantially equal to the amount of charge accumulated at the interfaces D, E, and F present in the slit portion 22S-containing region when an electric field is generated between the pixel electrode 20 and the linear portion 22E by the difference between the potential of a display signal and the common potential. That is, this configuration creates a symmetry in charge amount between these regions. Experiments performed by the inventors have shown that the symmetry is achieved independently of the thickness of the insulating layer 21, the inorganic layer portions 23, or the first alignment layer 24.

If the correlation between the layered members disposed on or above the linear portion 22E disagrees with the correlation between the layered members disposed under the slit portion 22S, a difference in charge amount is created between these regions with time after an electric field is generated between the pixel electrode 20 and the linear portion 22E by the difference between the potential of a display signal and the common potential. Therefore, the symmetry in charge amount between these regions is broken. This causes a direct current component between the pixel electrode 20 and the linear portion 22E to shift the center of an optimum common potential. The center of an optimum common potential that minimizes flickers is shifted by 150 mV during electric conduction for, for example, ten hours. Therefore, the fact that the center of such an optimum common potential that minimizes flickers is not shifted during electrical conduction suggests that the symmetry in charge amount between these regions is substantially maintained.

The symmetry prevents an unnecessary direct current component from being generated between the pixel electrode 20 and the linear portion 22E; hence, an electric field corresponding only to a display signal is generated. Therefore, the shift of the center of an optimum common potential and image sticking, which occur in conventional FFS-mode liquid crystal displays, are prevented. This allows the liquid crystal display to have display quality higher than that of conventional ones.

The liquid crystal display, which has the above configuration, can be manufactured through simple steps at low cost. This is because the common electrode 22 and the inorganic layer portions 23 are formed together by patterning in a single dry etching step.

The material used to form the first alignment layer 24 or the liquid crystal LC need not be changed to achieve the above advantages. This eliminates trade-off problems such as a reduction in orientation force and image sticking due to excessive charge transfer.

In this embodiment, the slit portions 22S and the linear portions 22E are not limited to those shown in FIG. 2. The longitudinal direction of the slit portions 22S and that of the linear portions 22E may be parallel to the source lines 16S or may diagonally intersect the gate lines 13. The slit portions 22S and the linear portions 22E may have a length sufficient to extend over some of the pixels PXL. The slit portions 22S and the linear portions 22E need not be linear and may have a curved shape, a wavy shape, or a zigzag shape. Alternatively, the slit portions 22S and the linear portions 22E may have a comb shape. The present invention is not limited to the second embodiment and may be applied to a liquid crystal display including a first electrode functioning as a common electrode and second electrodes functioning as pixel electrodes. That is, the following members may be formed in this order: a common electrode is formed on a planarization layer 18, an insulating layer 21 is formed on this planarization layer 18, and pixel electrodes each including a plurality of linear portions and slit portions substantially identical to those of that common electrode 22 are formed on this insulating layer 21. In this case, inorganic layer portions 23 are each formed on a corresponding one of these linear portions. This configuration is also effective in achieving the above advantages.

Third Embodiment

Figure 9:
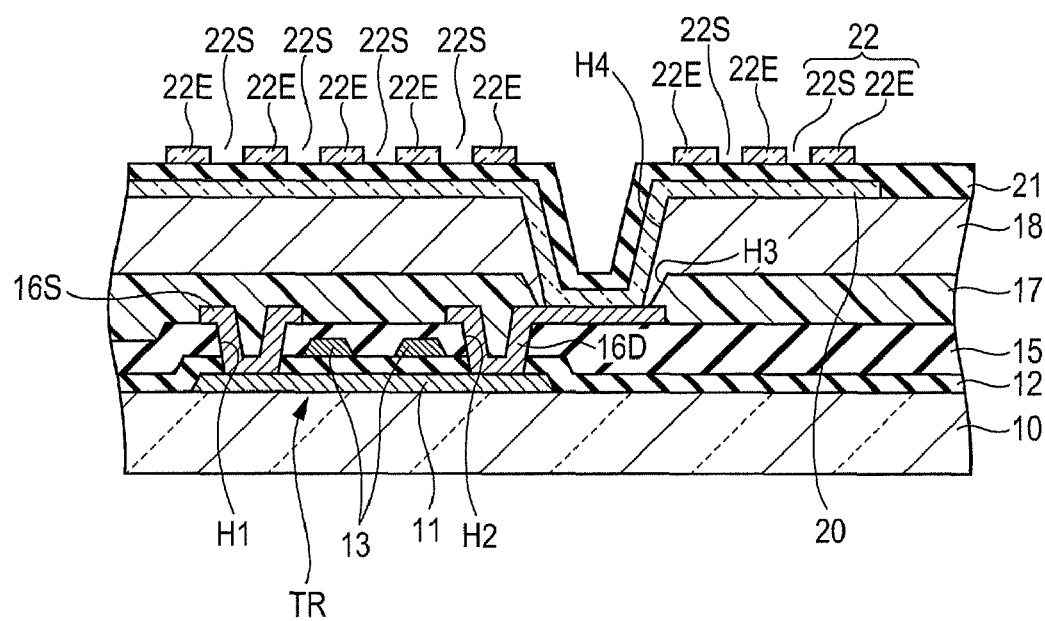
FIG. 9 is a sectional view illustrating a method of manufacturing a liquid crystal display according to a third embodiment of the present invention.
Figure 10:
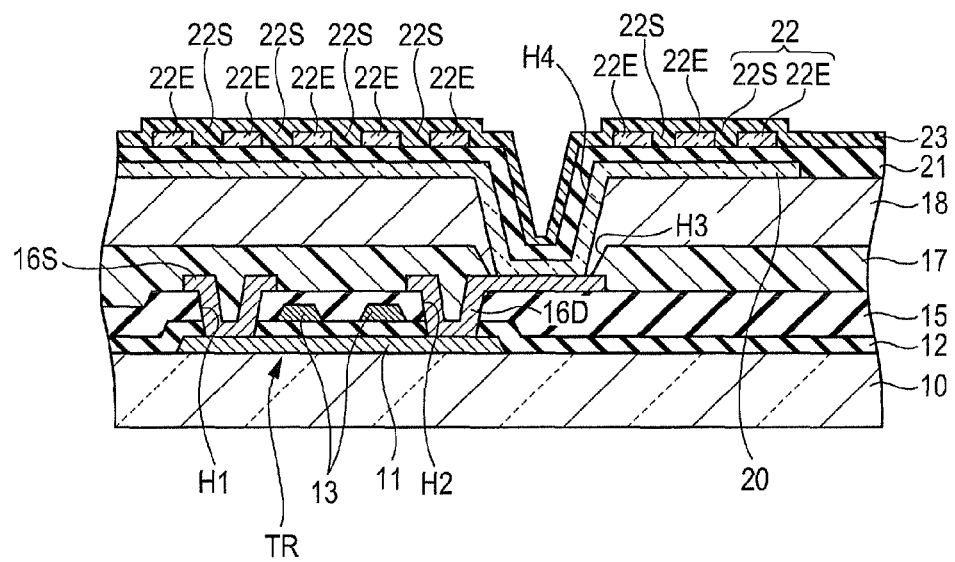
FIG. 10 is a sectional view illustrating the method according to the third embodiment.
Figure 11:
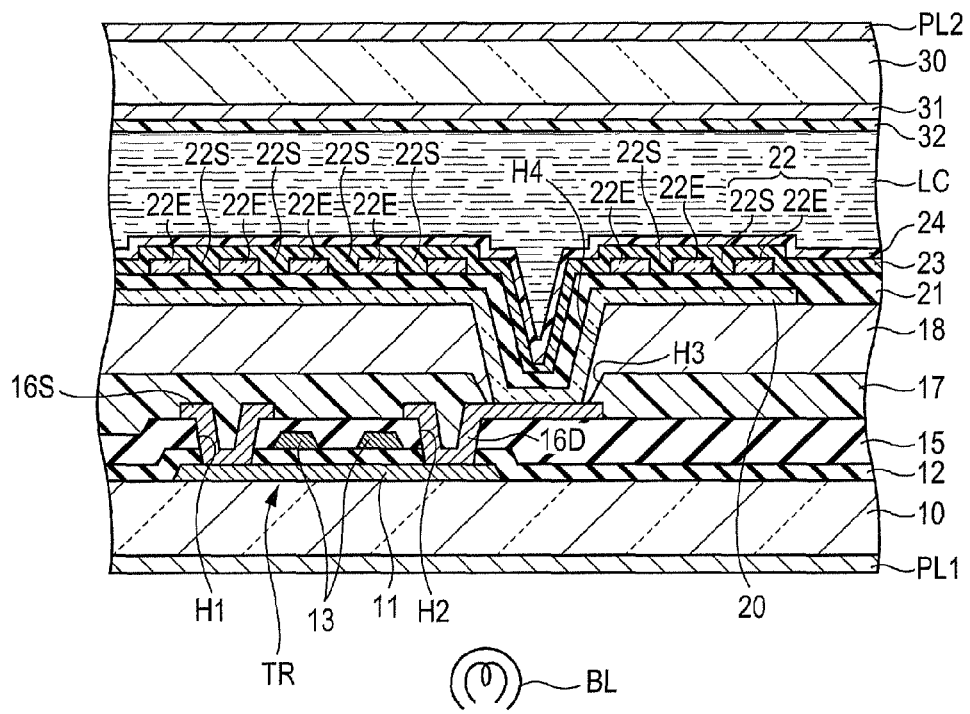
FIG. 11 is a sectional view illustrating the method according to the third embodiment.

A third embodiment of the present invention provides a method of manufacturing liquid crystal displays. The method will now be described with reference to drawings below. FIGS. 4A, and 9 to 11 show one of pixels PXL arranged in a display section 10A included in each liquid crystal display. In FIGS. 9 to 11, the same members as those shown in FIGS. 1 to 8 and 17 are denoted by the same reference numerals as those used in FIGS. 1 to 8 and 17.

As shown in FIG. 4A, active layers 11 are formed in a region of the display section 10A, the region being disposed on a first transparent substrate 10 and being used to form the pixels PXL and pixel transistors TR. A gate insulating layer 12 is formed on the first transparent substrate 10 so as to cover the active layers 11. Gate lines 13 are formed on the gate insulating layer 12 so as to overlap the active layers 11. A common electrode line, which is not shown, supplied with a common potential is also formed on a portion of the gate insulating layer 12 that is located near an end portion of the display section 10A.

An interlayer insulating layer 15 is formed on a portion of the gate insulating layer 12 so as to cover the gate lines 13 and the common electrode line, the portion being disposed in the display section 10A. Source lines 16S and drain electrodes 16D are formed on the interlayer insulating layer 15, the source lines 16S being connected to sources of the active layers 11 through first contact holes H1, the drain electrodes 16D being connected to drains of the active layers 11 through second contact holes H2.

The source lines 16S and the drain electrodes 16D are laminates formed together from a single layer including, for example, a titanium sub-layer, aluminum sub-layer, and titanium sub-layer arranged in that order. A passivation layer 17 is formed on the interlayer insulating layer 15 so as to cover the source lines 16S and the drain electrodes 16D. The passivation layer 17 is a silicon nitride film formed at, for example, 300° C. to 400° C.

The passivation layer 17 is masked with a resist layer (not shown) and is then dry-etched, whereby third contact holes H3 are formed in the passivation layer 17. The drain electrodes 16D are exposed through the third contact holes H3.

After the resist layer is removed, a planarization layer 18 such as an organic layer is formed over the walls of the third contact holes H3 and the passivation layer 17. The planarization layer 18 is masked with another resist layer (not shown) and is then dry-etched, whereby fourth contact holes H4 are formed in the planarization layer 18. The fourth contact holes H4 are connected to the third contact holes H3 and therefore the drain electrodes 16D are exposed through the third and fourth contact holes H3 and H4.

Pixel electrodes 20 are formed on the planarization layer 18 so as to extend through the fourth contact holes H4 to the drain electrodes 16D. The pixel electrodes 20 are an example of first electrodes specified in the claims. The pixel electrodes 20 are formed from a transparent conductive material such as ITO or IZO by patterning. The pixel electrodes 20 preferably have a thickness of about 100 nm.

An insulating layer 21 is formed on the planarization layer 18 so as to cover the pixel electrodes 20. The insulating layer 21 is a nitrogen compound-containing inorganic film such as a silicon nitride film formed at a low temperature of about 200° C. The insulating layer 21 is an example of a first inorganic layer specified in the claims.

As shown in FIG. 9, a common electrode 22 is formed on the insulating layer 21. The common electrode 22 includes linear portions 22E and slit portions 22S which are alternately arranged and which extend in parallel to each other and also allows inorganic layer portions 23. The common electrode 22 is formed from a transparent conductive material such as ITO or IZO by patterning.

As shown in FIG. 10, an inorganic layer 23 is formed over the insulating layer 21, the linear portions 22E, and the slit portions 22S. The inorganic layer 23 contains a nitrogen compound such as silicon nitride and is formed by a CVD process or another deposition process. The thickness of the inorganic layer 23 is not particularly limited and is, for example, about 50 nm or less. The inorganic layer 23 is an example of a second inorganic layer specified in the claims.

The inorganic layer 23 and the insulating layer 21 may be inorganic films other than silicon nitride films and are preferably formed from the same material.

Alternatively, the inorganic layer 23 and the insulating layer 21 may contain an oxygen compound such as silicon dioxide or a compound, such as silicon oxynitride, containing oxygen and nitrogen.

An example of a process, other than the CVD process, for forming the inorganic layer 23 is as follows: paste containing silicon and an organic material is formed into a layer by a coating process such as a spin coating process or a printing process and is then baked, whereby a silicon dioxide layer, that is, the inorganic layer 23 is obtained.

The inorganic layer 23 is preferably formed by the printing process, which is an example of the coating process, or in such a manner that an inorganic material is printed (for example, screen-printed or relief-printed) to form a predetermined pattern. This is because the use of the printing process eliminates a patterning step that is necessary for the CVD process or another coating process to form openings in a portion of the inorganic layer 23 that extends over the terminals TL, which are arranged in the terminal section 10T shown in FIG. 1; hence, the method can be simplified.

As shown in FIG. 11, a first alignment layer 24 is formed over the inorganic layer portions 23. The first alignment layer 24 is made of a polyimide-based resin. The rubbing direction of the first alignment layer 24 is planarly inclined at about five to ten degrees to the longitudinal direction of the linear portions 22E. The first alignment layer 24 is an example of an alignment layer specified in the claims.

A second transparent substrate 30 is attached to the first transparent substrate 10. A liquid crystal LC, such as a nematic liquid crystal, having positive dielectric anisotropy is sealed between the first and second transparent substrates 10 and 30. The second transparent substrate 30 has a surface facing the first transparent substrate 10 and this surface carries a black matrix (not shown), a color filter 31, and a second alignment layer 32 extending thereover. The second alignment layer 32 is made of a polyimide-based resin. The rubbing direction of the second alignment layer 32 is parallel to that of the first alignment layer 24.

In a portion of the above procedure, a first polarizer PL1 is provided on a surface of the first transparent substrate 10 that faces a light source BL. The transmission axis of the first polarizer PL1 is parallel to the rubbing direction of the first alignment layer 24. In a portion of the procedure, a second polarizer PL2 is provided on a surface of the second transparent substrate 30 that oppositely faces the first transparent substrate 10. The transmission axis of the second polarizer PL2 is perpendicular to the rubbing direction of the first polarizer PL1.

A laminate including the first and second transparent substrates 10 and 30 and the above members is divided into the liquid crystal displays by scribing or breaking.

Suppose attention is focused on the correlation between layered members disposed between the liquid crystal LC and pixel electrodes 20 of the display section 10A of each liquid crystal display completed as described above. The correlation between layered members disposed on or above the linear portions 22E agrees with the correlation between layered members disposed under the slit portions 22S. This is the result achieved by the deposition of the inorganic layer portions 23 over the linear portions 22E and the slit portions 22S.

Figure 12:
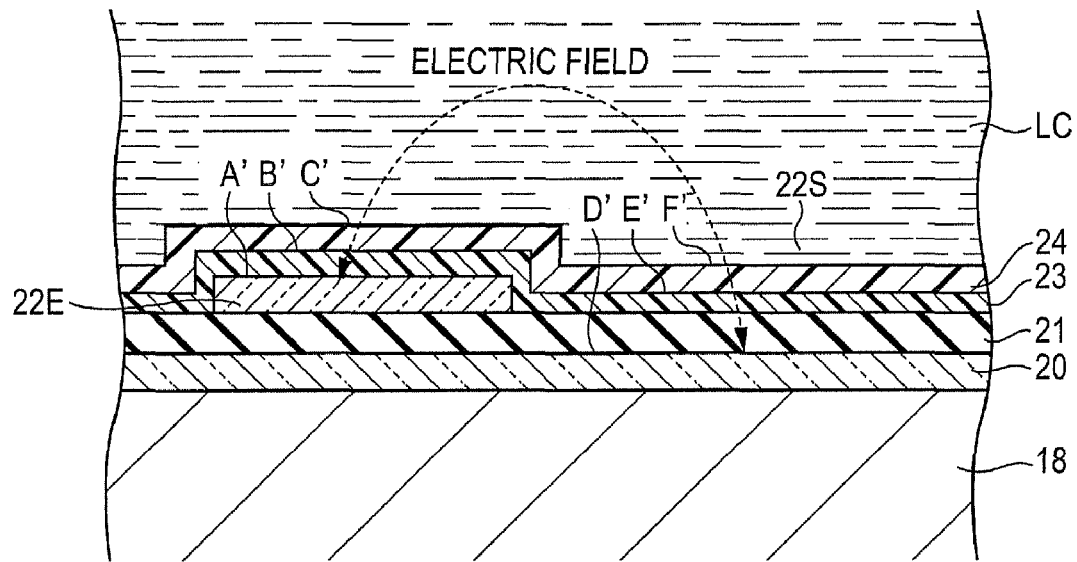
FIG. 12 is a sectional view of the liquid crystal display manufactured by the method according to the third embodiment.

The agreement of these correlations will now be described with reference to a drawing below. FIG. 12 is a partly enlarged view showing members arranged near the first alignment layer 24 shown in FIG. 11. In each region containing a corresponding one of the linear portions 22E, the following interfaces are arranged on the linear portion 22E in this order as shown in FIG. 12: the interface A' between the linear portion 22E, which is made of a transparent conductive material such as ITO, and the inorganic layer 23, which is made of silicon nitride or the like; the interface B' between the inorganic layer 23 and the first alignment layer 24, which is made of a polyimide-based resin; and the interface C' between the first alignment layer 24 and the liquid crystal LC.

On the other hand, in each region containing a corresponding one of the slit portions 22S, the following interfaces are arranged in this order: the interface D' between a corresponding one of the pixel electrodes 20, which are made of a transparent conductive material such as ITO, and the insulating layer 21, which is made of an inorganic material such as silicon nitride; the interface E' between the inorganic layer 23, which is made of silicon nitride or the like, and the first alignment layer 24, which is made of a polyimide-based resin; and the interface F' between the first alignment layer 24 and the liquid crystal LC. That is, the correlation between layered members disposed on or above the linear portion 22E agrees with the correlation between layered members disposed under the slit portion 22S.

Since the insulating layer 21 and the inorganic layer 23 are made of the same inorganic material and a difference therebetween due to a forming process is negligible, the following interface is left out of consideration: the interface between a portion of the insulating layer 21 that is disposed under the slit portion 22S and a portion of the inorganic layer 23 that is disposed in the slit portion 22S.

This configuration allows the amount of charge accumulated at the interfaces A', B', and C' present in the linear portion 22E-containing region to be substantially equal to the amount of charge accumulated at the interfaces D', E', and F' present in the slit portion 22S-containing region when an electric field is generated between the pixel electrode 20 and the linear portion 22E by the difference between the potential of a display signal and a common potential. That is, this configuration creates a symmetry in charge amount between these regions. Experiments performed by the inventors have shown that the symmetry is achieved independently of the thickness of the insulating layer 21, the inorganic layer 23, or the first alignment layer 24.

The symmetry prevents an unnecessary direct current component from being generated between the pixel electrode 20 and the linear portion 22E; hence, an electric field corresponding only to a display signal is generated. Therefore, the shift of the center of an optimum common potential and image sticking, which occur in conventional FFS-mode liquid crystal displays, are prevented. This allows the liquid crystal display to have display quality higher than that of conventional ones.

The material used to form the first alignment layer 24 or the liquid crystal LC need not be changed to achieve the above advantages. This eliminates trade-off problems such as a reduction in orientation force and image sticking due to excessive charge transfer.

In this embodiment, the inorganic layer 23 and the insulating layer 21 are made of the same material. The present invention is not limited to this configuration. The inorganic layer 23 and the insulating layer 21 may be made of different materials that prevent unnecessary charge from being accumulated at the interface between these layers, although the above advantages are reduced. When the insulating layer 21 is made of silicon nitride, the inorganic layer 23 may be made of, for example, silicon dioxide.

The slit portions 22S and the linear portions 22E are not limited to those shown in FIG. 2. The longitudinal direction of the slit portions 22S and that of the linear portions 22E may be parallel to the source lines 16S or may diagonally intersect the gate lines 13. The slit portions 22S and the linear portions 22E may have a length sufficient to extend over some of the pixels PXL. The slit portions 22S and the linear portions 22E need not be linear and may have a curved shape, a wavy shape, or a zigzag shape. Alternatively, the slit portions 22S and the linear portions 22E may have a comb shape.

The present invention is not limited to this embodiment and may be applied to a liquid crystal display including a common electrode corresponding to a first electrode and pixel electrodes corresponding to second electrodes. That is, the following members may be formed in this order: this common electrode is formed on a planarization layer 18, an insulating layer 21 is formed on this common electrode, and these pixel electrodes each including a plurality of linear portions and slit portions substantially identical to those of that common electrode 22 are formed on this insulating layer 21. In this case, an inorganic layer 23 is formed over this insulating layer 21 and the linear portions and slit portions of these pixel electrodes. This configuration is also effective in achieving the above advantages.

Fourth Embodiment

Figure 13:
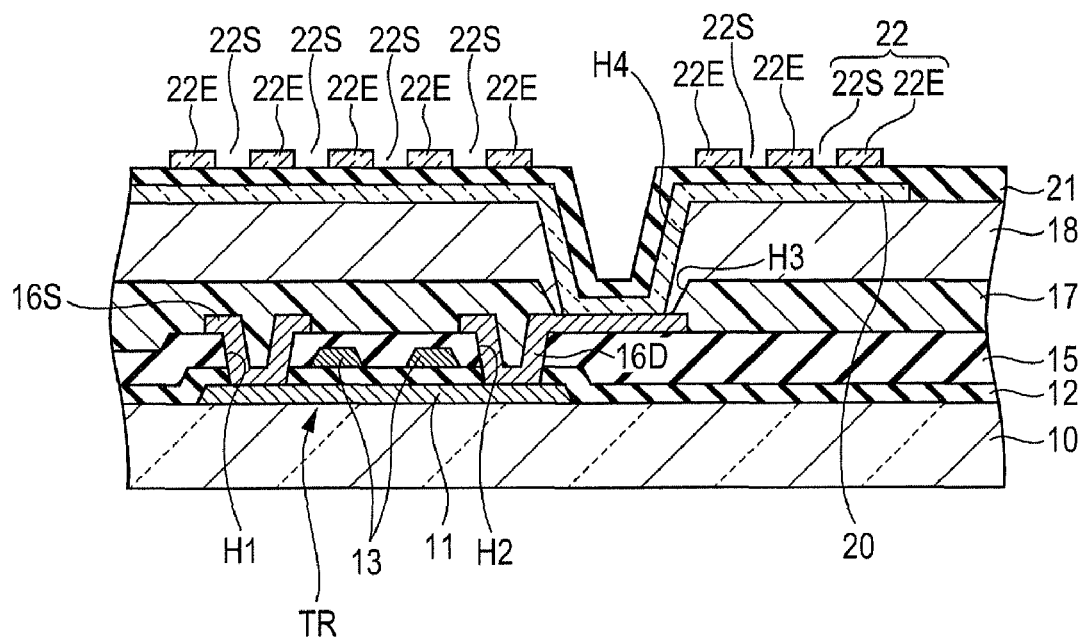
FIG. 13 is a sectional view illustrating a method of manufacturing a liquid crystal display according to a fourth embodiment of the present invention.
Figure 14:
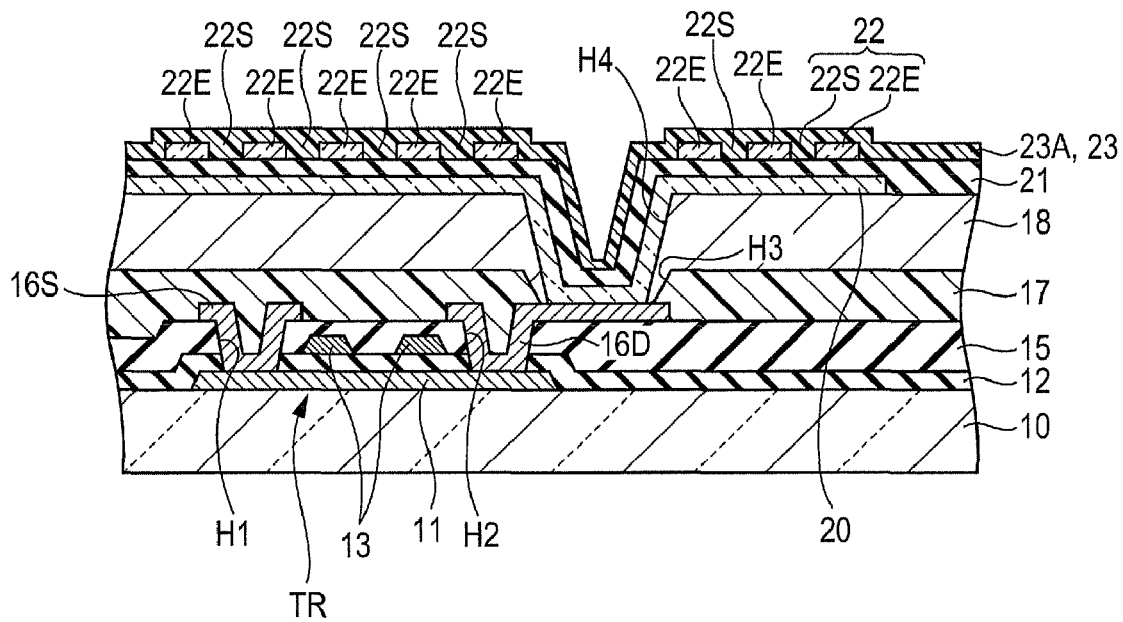
FIG. 14 is a sectional view illustrating the method according to the fourth embodiment.
Figure 15:
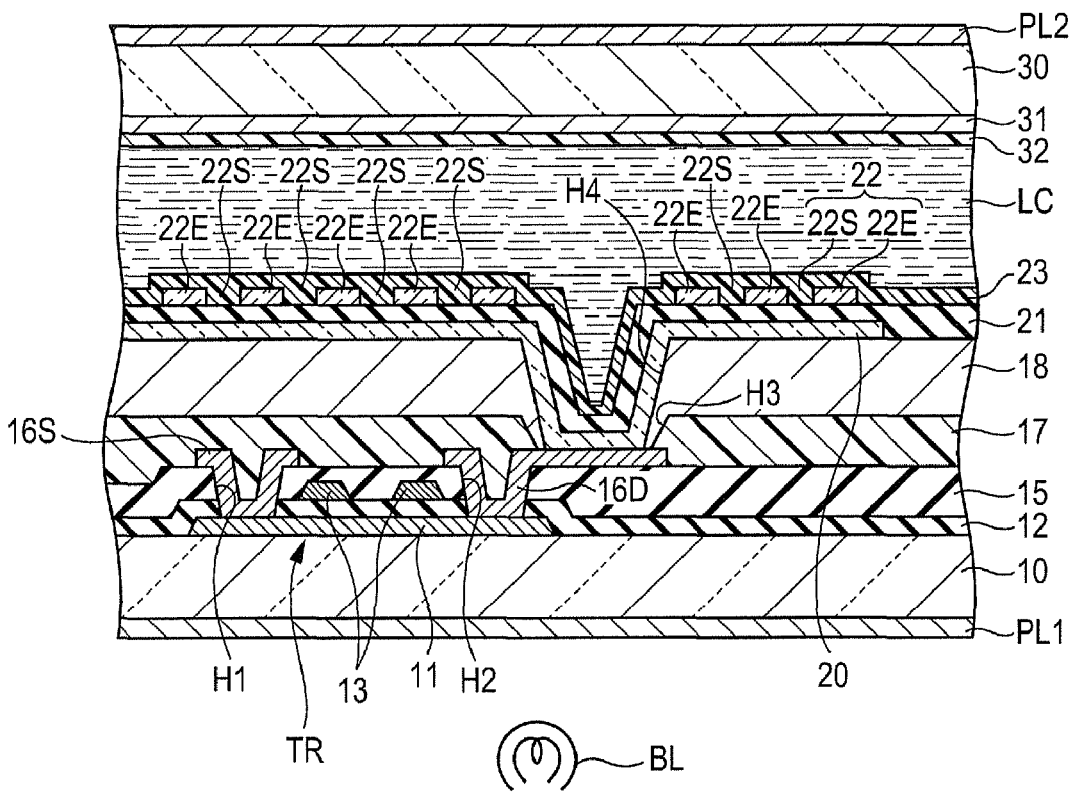
FIG. 15 is a sectional view illustrating the method according to the fourth embodiment.

A fourth embodiment of the present invention provides a method of manufacturing liquid crystal displays. The method will now be described with reference to drawings below. FIGS. 4A, and 13 to 15 show one of pixels PXL arranged in a display section 10A included in each liquid crystal display. In FIGS. 13 to 15, the same members as those shown in FIGS. 1 to 12 and 17 are denoted by the same reference numerals as those used in FIGS. 1 to 12 and 17.

As shown in FIG. 4A, active layers 11 are formed in a region of the display section 10A, the region being disposed on a first transparent substrate 10 and being used to form the pixels PXL and pixel transistors TR. A gate insulating layer 12 is formed on the first transparent substrate 10 so as to cover the active layers 11. Gate lines 13 are formed on the gate insulating layer 12 so as to overlap the active layers 11. A common electrode line, which is not shown, supplied with a common potential is also formed on a portion of the gate insulating layer 12 that is located near an end portion of the display section 10A.

An interlayer insulating layer 15 is formed on a portion of the gate insulating layer 12 so as to cover the gate lines 13 and the common electrode line, the portion being disposed in the display section 10A. Source lines 16S and drain electrodes 16D are formed on the interlayer insulating layer 15, the source lines 16S being connected to sources of the active layers 11 through first contact holes H1, the drain electrodes 16D being connected to drains of the active layers 11 through second contact holes H2.

The source lines 16S and the drain electrodes 16D are laminates formed together from a single layer including, for example, a titanium sub-layer, aluminum sub-layer, and titanium sub-layer arranged in that order. A passivation layer 17 is formed on the interlayer insulating layer 15 so as to cover the source lines 16S and the drain electrodes 16D. The passivation layer 17 is a silicon nitride film formed at, for example, 300° C. to 400° C.

The passivation layer 17 is masked with a resist layer (not shown) and is then dry-etched, whereby third contact holes H3 are formed in the passivation layer 17. The drain electrodes 16D are exposed through the third contact holes H3.

After the resist layer is removed, a planarization layer 18 such as an organic layer is formed over the walls of the third contact holes H3 and the passivation layer 17. The planarization layer 18 is masked with another resist layer (not shown) and is then dry-etched, whereby fourth contact holes H4 are formed in the planarization layer 18. The fourth contact holes H4 are connected to the third contact holes H3 and therefore the drain electrodes 16D are exposed through the third and fourth contact holes H3 and H4.

Pixel electrodes 20 are formed on the planarization layer 18 so as to extend through the fourth contact holes H4 to the drain electrodes 16D. The pixel electrodes 20 are an example of first electrodes specified in the claims. The pixel electrodes 20 are formed from a transparent conductive material such as ITO or IZO by patterning. The pixel electrodes 20 preferably have a thickness of about 100 nm.

An organic insulating layer 21 is formed on the planarization layer 18 so as to cover the pixel electrodes 20. The organic insulating layer 21 is made of an organic material, such as a polyimide-based resin, having an imide bond. The thickness of the organic insulating layer 21 is not particularly limited and is, for example, about 150 nm. The organic insulating layer 21 is an example of a first inorganic layer specified in the claims.

As shown in FIG. 13, a common electrode 22 is formed on the organic insulating layer 21. The common electrode 22 includes linear portions 22E and slit portions 22S which are alternately arranged and which extend in parallel to each other and also allows inorganic layer portions 23. The common electrode 22 is formed from a transparent conductive material such as ITO or IZO by patterning.

As shown in FIG. 14, an organic layer 23A is formed over the organic insulating layer 21, the linear portions 22E, and the slit portions 22S. The organic layer 23A is made of an organic material having an imide bond or a polyimide-based resin. The thickness of the organic layer 23A is not particularly limited and is, for example, about 70 nm. The organic layer 23A is an example of a second inorganic layer specified in the claims.

The organic layer 23A is formed by a coating process such as a spin coating process using an organic material or a printing process for printing an organic material. The organic layer 23A is preferably formed by the printing process, which is an example of the coating process, or in such a manner that an inorganic material is printed to form a predetermined pattern. Examples of the printing process include a screen printing process and an ink jet printing process. The use of the printing process eliminates a patterning step that is necessary for other coating processes to remove the organic layer 23A from the terminal section 10T shown in FIG. 1; hence, the method can be simplified.

The organic layer 23A is rubbed in a predetermined alignment direction, whereby the organic layer 23A is converted into a first alignment layer 23. The rubbing direction of the first alignment layer 23 is planarly inclined at about five to ten degrees to the longitudinal direction of the linear portions 22E. The first alignment layer 23 is an example of an alignment layer specified in the claims.

The organic insulating layer 21 and the first alignment layer 23, which is derived from the organic layer 23A, may be made of an organic material, other than a polyimide-based resin, having an imide bond and are preferably made of the same material. Alternatively, the organic insulating layer 21 and the first alignment layer 23 may be made of a polyamide-based resin such as a polyamic acid resin.

As shown in FIG. 15, a second transparent substrate 30 is attached to the first transparent substrate 10. A liquid crystal LC, such as a nematic liquid crystal, having positive dielectric anisotropy is sealed between the first and second transparent substrates 10 and 30. The second transparent substrate 30 has a surface facing the first transparent substrate 10 and this surface carries a black matrix (not shown), a color filter 31, and a second alignment layer 32 extending thereover. The second alignment layer 32 is made of a polyimide-based resin. The rubbing direction of the second alignment layer 32 is parallel to that of the first alignment layer 23.

In a portion of the above procedure, a first polarizer PL1 is provided on a surface of the first transparent substrate 10 that faces a light source BL. The transmission axis of the first polarizer PL1 is parallel to the rubbing direction of the first alignment layer 23. In a portion of the procedure, a second polarizer PL2 is provided on a surface of the second transparent substrate 30 that oppositely faces the first transparent substrate 10. The transmission axis of the second polarizer PL2 is perpendicular to the rubbing direction of the first polarizer PL1.

A laminate including the first and second transparent substrates 10 and 30 and the above members is divided into the liquid crystal displays by scribing or breaking.

Suppose attention is focused on the correlation between layered members disposed between the liquid crystal LC and pixel electrodes 20 of the display section 10A of each liquid crystal display completed as described above. The correlation between layered members disposed on or above the linear portions 22E agrees with the correlation between layered members disposed under the slit portions 22S. This is the result achieved by the presence of the organic insulating layer 21 between the common electrode 22 and the pixel electrodes 20 and the presence of the first alignment layer 23, which is derived from the organic layer 23A, over the linear portions 22E and the slit portions 22S.

Figure 16:
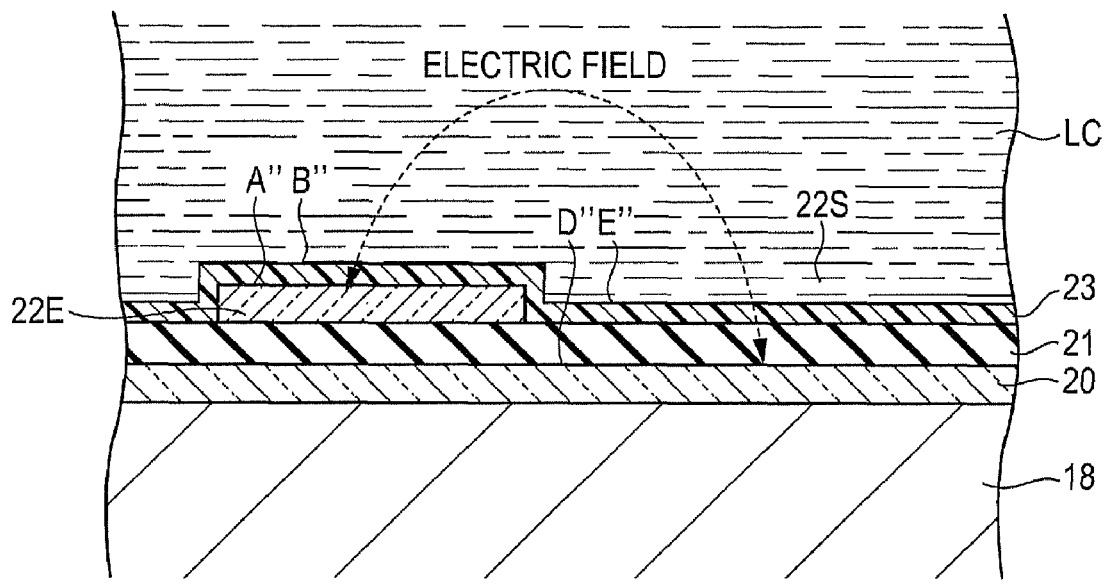
FIG. 16 is a sectional view of the liquid crystal display manufactured by the method according to the fourth embodiment.

The agreement of these correlations will now be described with reference to a drawing below. FIG. 16 is a partly enlarged view showing members arranged near the first alignment layer 23 shown in FIG. 15. In each region containing a corresponding one of the linear portions 22E, the following interfaces are arranged on the linear portion 22E in this order as shown in FIG. 16: the interface A" between the linear portion 22E, which is made of a transparent conductive material such as ITO, and the first alignment layer 23, which is made of an organic material such as a polyimide-based resin, and the interface B" between the first alignment layer 23 and the liquid crystal LC.

On the other hand, in each region containing a corresponding one of the slit portions 22S, the following interfaces are arranged in this order: the interface D" between a corresponding one of the pixel electrodes 20, which are made of a transparent conductive material such as ITO, and the organic insulating layer 21, which is made of an organic material such as a polyimide-based resin, and the interface E" between the first alignment layer 23, which is made of an organic material such as a polyimide-based resin, and the liquid crystal LC. That is, the correlation between layered members disposed on or above the linear portion 22E agrees with the correlation between layered members disposed under the slit portion 22S.

Since the organic insulating layer 21 and the first alignment layer 23 are made of the same inorganic material and a difference therebetween due to a forming process is negligible, the following interface is left out of consideration: the interface between a portion of the organic insulating layer 21 that is disposed under the slit portion 22S and a portion of the first alignment layer 23 that is disposed in the slit portion 22S.

This configuration allows the amount of charge accumulated at the interfaces A" and B" present in the linear portion 22E-containing region to be substantially equal to the amount of charge accumulated at the interfaces D" and E" present in the slit portion 22S-containing region when an electric field is generated between the pixel electrode 20 and the linear portion 22E by the difference between the potential of a display signal and a common potential. That is, this configuration creates a symmetry in charge amount between these regions. Experiments performed by the inventors have shown that the symmetry is achieved independently of the thickness of the organic insulating layer 21 or the first alignment layer 23.

The symmetry prevents an unnecessary direct current component from being generated between the pixel electrode 20 and the linear portion 22E; hence, an electric field corresponding only to a display signal is generated. Therefore, the shift of the center of an optimum common potential and image sticking, which occur in conventional FFS-mode liquid crystal displays, are prevented. This allows the liquid crystal display to have display quality higher than that of conventional ones.

The material used to form the first alignment layer 23 or the liquid crystal LC need not be changed to achieve the above advantages. This eliminates trade-off problems such as a reduction in orientation force and image sticking due to excessive charge transfer.

In this embodiment, the organic insulating layer 21 and the first alignment layer 23, which is derived from the organic layer 23A, are made of the same material. The present invention is not limited to this configuration. The organic insulating layer 21 and the first alignment layer 23 may be made of different organic materials that prevent unnecessary charge from being accumulated at the interface between these layers, although the above advantages are reduced. When the first alignment layer 23, which is derived from the organic layer 23A, is made of an organic material such as a polyimide-based resin, the organic insulating layer 21 may be a polyamide-based resin such as a polyamic acid resin.

The slit portions 22S and the linear portions 22E are not limited to those shown in FIG. 2. The longitudinal direction of the slit portions 22S and that of the linear portions 22E may be parallel to the source lines 16S or may diagonally intersect the gate lines 13. The slit portions 22S and the linear portions 22E may have a length sufficient to extend over some of the pixels PXL. The slit portions 22S and the linear portions 22E need not be linear and may have a curved shape, a wavy shape, or a zigzag shape. Alternatively, the slit portions 22S and the linear portions 22E may have a comb shape.

The present invention is not limited to this embodiment and may be applied to a liquid crystal display including a common electrode corresponding to a first electrode and pixel electrodes corresponding to second electrodes. That is, the following members may be formed in this order: this common electrode is formed on a planarization layer 18, an organic insulating layer 21 is formed on this common electrode, and these pixel electrodes each including a plurality of linear portions and slit portions substantially identical to those of that common electrode 22 are formed on this organic insulating layer 21. In this case, a first alignment layer 23 is formed over this organic insulating layer 21 and the linear portions and slit portions of these pixel electrodes. This configuration is also effective in achieving the above advantages.

In this liquid crystal display, which includes this common electrode corresponding to a first electrode and these pixel electrodes corresponding to second electrodes, contact holes need to be formed in this organic insulating layer 21 such that these pixel electrodes are each connected to a pixel transistor TR included in a corresponding one of pixels PXL.

Figure 17:
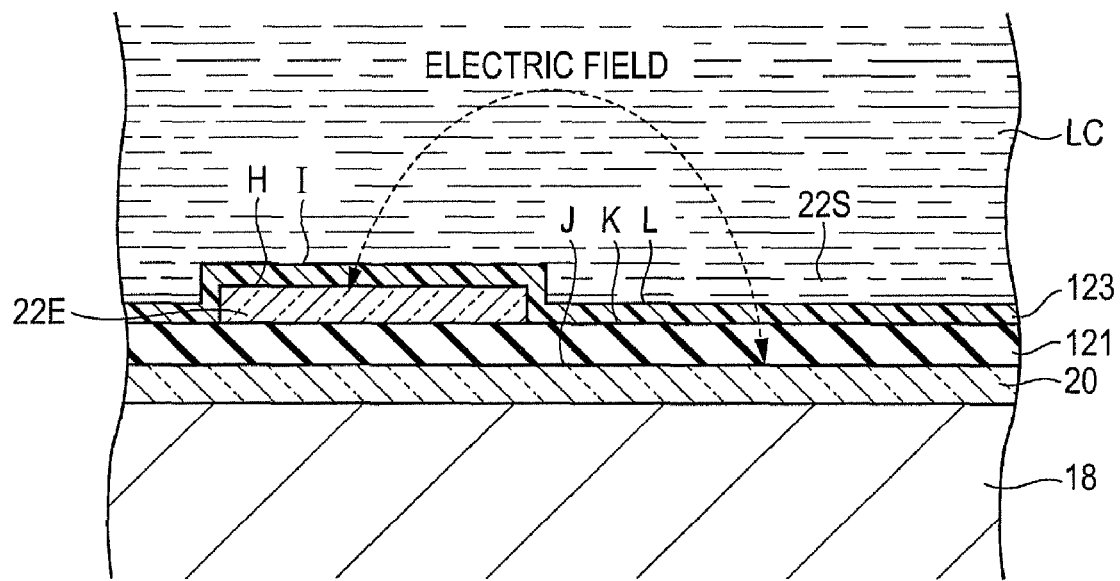
FIG. 17 is a sectional view of a conventional liquid crystal display.

If an organic insulating layer 121, shown in FIG. 17, made of an organic material such as silicon nitride is used instead of this organic insulating layer 21, an etching step is necessary to pattern the organic insulating layer 121. This causes an increase in manufacturing cost.

According to this embodiment, this organic insulating layer 21 is made of a photosensitive organic material and the contact holes can be formed in such a manner that this insulating layer 21 is patterned by a simple photolithographic process; hence, the etching step is not necessary.

The entire disclosure of Japanese Patent Application No. 2008-063711, filed Mar. 13, 2008, 2008-063710, filed Mar. 13, 2008 and 2008-070792, filed Mar. 19, 2008 are expressly incorporated by reference herein.

What is claimed is:

1. A liquid crystal display comprising:
a liquid crystal disposed between a first transparent substrate and a second transparent substrate;
a first electrode and second electrode which overlie the first transparent substrate and which are used to drive the liquid crystal;
one or more layers overlying the first electrode; and
one or more layers overlying the second electrode,
wherein the correlation between layers disposed between the first electrode and the liquid crystal agrees with the correlation between layers disposed between the second electrode and the liquid crystal, a first inorganic layer extending over the first electrode;
a second inorganic layer overlying the second electrode; and an alignment layer extending over the second inorganic layer;

wherein the second electrode includes linear portions and slit portions alternately arranged on or above the first inorganic layer, wherein portions of the second inorganic layer are disposed only on the linear portions and the alignment layer extends over the first inorganic layer, the second electrode, and the second inorganic layer.

2. The liquid crystal display according to claim 1, wherein the second inorganic layer extends over the first inorganic layer, the linear portions, and the slit portions.

3. The liquid crystal display according to claim 1, wherein the first and second inorganic layers are made of the same material.

4. The liquid crystal display according to claim 1, wherein the first and second inorganic layers contain at least one compound selected from the group consisting of a nitrogen compound, and an oxygen compound.

5. The liquid crystal display according to claim 1, further comprising:

an organic layer which is made of an organic material having an imide bond and which extends over the first electrode; and an alignment layer made of an organic material having an imide bond, wherein the second electrode includes linear portions and slit portions alternately arranged on or above the inorganic layer and the alignment layer extends over the organic layer, the linear portions, and the slit portions.

6. The liquid crystal display according to claim 1, further comprising:

an organic layer which is made of an organic material such as polyamide and which extends over the first electrode; and an alignment layer made of an organic material such as polyamide, wherein the second electrode includes linear portions and slit portions alternately arranged on or above the inorganic layer and the alignment layer extends over the organic layer, the linear portions, and the slit portions.

7. The liquid crystal display according to claim 5, wherein the organic layer and the alignment layer are made of the same material.

8. The liquid crystal display according to claim 1, wherein the first and second electrodes are transparent.

* * * * *